Oct. 25, 1966 V. E. HAZEL ET AL 3,281,328
NUCLEAR FUEL ROD ASSEMBLY
Filed June 16, 1965
2 Sheets-Sheet 1

INVENTORS
VICTOR E. HAZEL
JOHN J. ZELLER
BY
ATTORNEY

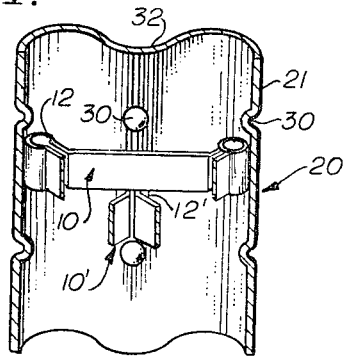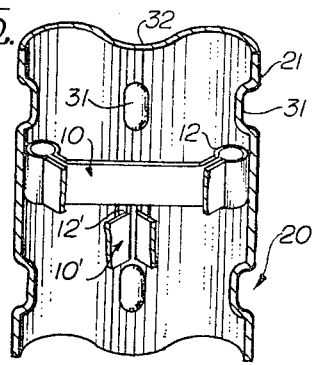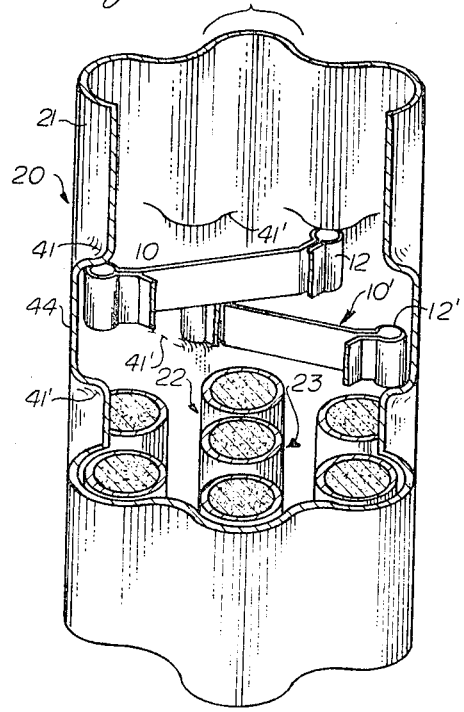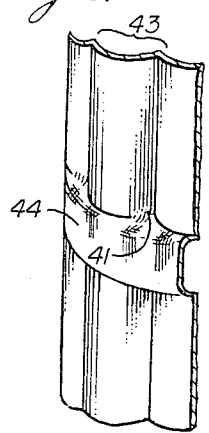

3,281,328
NUCLEAR FUEL ROD ASSEMBLY
Victor E. Hazel, San Jose, and John Joseph Zeller, Los Angeles, Calif., assignors to the United States of America as represented by the United States Atomic Energy Commission
Filed June 16, 1965, Ser. No. 464,587
4 Claims. (Cl. 176—78)

The invention described herein was made in the course of, or under, Contract No. AT(04-3)-189, Project Agreements 13 and 29 with the United States Atomic Energy Commission.

This invention relates generally to nuclear reactors and in particular to an assembly structure including specifically constructed spacer means for separating and positioning individual fuel rods to provide a nuclear fuel assembly adapted for disposition in the core of the reactor.

In fuel element assemblies comprising a plurality of fissile fuel filled rods, the maintenance of equidistant separation of the individual rods is necessary in order to permit equalized flow of coolant around all fuel rods as well as the maintenance of relatively uniform reactivity throughout the fuel element assembly in those nuclear reactors wherein the coolant is also an effective moderator of neutrons. Fuel element spacers of the prior art all attempt to fulfill the above requirements through the ues of various means including strips of metal slotted and assembled to form an egg-crate structure in each opening of which is placed a fuel rod; woven wire mesh systems equivalent to the egg-crate configuration; strips of metal bent in various fashions to form spring-like curved or undulating retaining bands placed between the fuel rods and holding them in spaced relationship by spring compression against each rod; or helically wound wire spacers around the exterior of the fuel rod.

The difficulties encountered with the egg-crate spacer construction derives from the need for either welding, brazing or otherwise fastening the spacer either to the fuel rods themselves or supporting structure to prevent longitudinal movement of the spacer. In the event one of the spacers is damaged or fails for one reason or another, the entire fuel element assembly must be discarded or repaired at considerable expense. The difficulties encountered with some types of spring-action spacer construction derive from the excessive local compression forces on the fuel rod by the spacer resulting not only in deforming or possibly puncturing the fuel rod itself but also in causing local overheating of the cladding due to the reduction in the rate of heat transfer from the fuel to the coolant resulting in premature failure of the rod through melting of the cladding and the release of dangerous radioactive materials into the coolant. The spacer means of the assembly of the present invention, by its particular configuration, not only eliminates the possibility of local compression forces causing premature fuel rod failure but also eliminates the need for permanently affixing the spacer to either the fuel rod or supporting structure so that all parts of the fuel element are easily assembled and disassembled for inspection, repair, adjustment or replacement of parts using few and simple tools.

It is therefore an object of this invention to provide an assembly structure including spacer devices for a cluster of nuclear reactor fuel rods of simplified construction and manner of installation.

It is a further object of this invention to provide a spacer device for a cluster of nuclear reactor fuel rods in which the spacers are not affixed to either the fuel rods or the supporting structure in rigidly fixed relation.

It is another object of this invention to provide a spacer device for a cluster of nuclear reactor fuel rods wherein only small local compression forces are exerted on the fuel rod by the spacer.

It is another object of this invention to provide a spacer device for a cluster of nuclear reactor fuel rods wherein localized overheating of the fuel rod is substantially reduced.

Other and more particular objects of this invention will be manifest upon study of the following detailed description when taken together with the accompanying drawing in which FIGURE 1 is an isometric view of a typical single spacer device of this invention;

FIGURE 4 is a longitudinal section through the fuel element of FIGURE 2 showing one version of the projecting type of spacer retaining means;

FIGURE 5 is a longitudinal section through the fuel element of FIGURE 2 showing another version of the projecting type of spacer retaining means;

FIGURE 6 is a longitudinal section through the fuel element of FIGURE 3 showing the recessed type of spacer retaining means; and FIGURE 7 is an isometric view of the fuel element of FIGURE 3 showing the external configuration of the recessed type of spacer retaining means as formed in the fuel element liner.

The assembly structure of the invention provides in general, for the positioning of fuel rods in a clustered ordered array adapted for disposition in the core of a nuclear reactor, e.g., a boiling water, steam cooled or pressurized water reactor. The fuel rods are of any appropriate conventional elongated cylindrical or similar configuration usually including a fissile material core provided with a tubular or otherwise impervious cladding. Moreover, it is contemplated to provide ordered arrays of a plurality of fuel rods such as a generally regular polygonal array, e.g., hexagonal 7 rod array fuel element assembly. The assembly will ordinarily include a supporting structure modified and/or adapted to cooperate with the aforesaid spacer means to effect the desired positioning, which structure may be of the generally conventional type having supporting structural members extending coextensively with the fuel rods and including end support structures of conventional design as well as means for directing coolant longitudinally through the fuel element array. Such conventional portions of the array not needed for comprehending the invention are omitted from the drawings.

Figure 1:
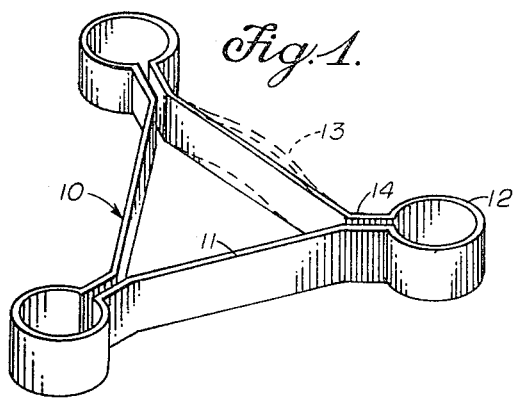

Referring to FIGURE 1, to provide for the positioning and spacing of the individual fuel rods in the array, there is provided devices 10 which comprise a continuous metal strip 11 bent to form an equilateral triangle having loops 12 formed to project outwardly at each interstice, i.e., corner of the triangle. Ordinarily, the loops 12 will be joined to the interstice by a short-necked portion 14 of parallel folded strip portions to accommodate fuel rods when arranged as described below. The continuous metal strip may be provided as a tubular section or a length of metal strip joined at the ends. Variation in rod spacing is achieved by varying the curvatures of strip 11 as, for example, according to dotted lines 13, where it forms the side of the triangle.

Figure 2:
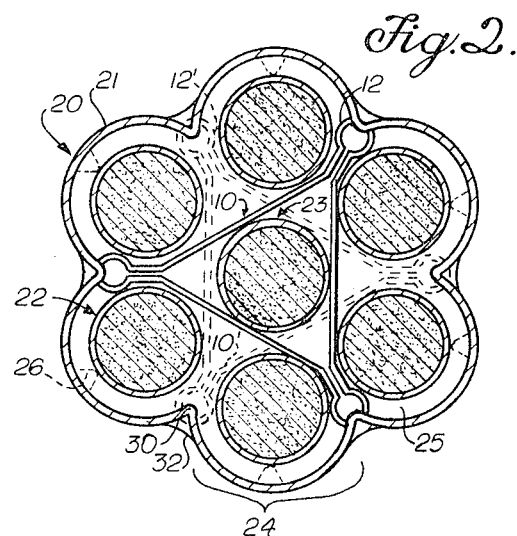
FIGURE 2 is a transverse section through a typical seven rod fuel element showing the arrangement of a spacer device fitted into a projecting type of spacer retaining means.

A fuel element assembly 20 employing the spacer devices 10 and 10' is constructed as shown in FIGURE 2 of the drawings in which a liner 21 is employed as the longitudinal member of the supporting structure mentioned supra. A cluster of fuels rods including 6 fuel rods 22 arranged in a generally regular hexagonal pattern in spaced relationship circumjacent a central fuel rod 23 is positioned within the liner 21 and is supported by conventional means at the top and bottom (not shown) to prevent longitudinal movement therein.

Fuel element liner 21 is generally cylindrical and scalloped as required to form curved portion 24 forming a substantially uniform width channel 25 between outer fuel rods 22 and liner 21 to permit the free flow of coolant around all parts of the fuel rods. To prevent outer fuel rods 21 from encroaching on channel 25, spacing projection indentations 26 are provided in liner 21.

Pairs of spacer devices 10 and 10' of this invention are arranged in the fuel element assembly with the triangular side members encompassing central fuel rod 23 such that the geometric center of the triangular shaped spacers is coincidental with the longitudinal axis of said central fuel rod 23 with the members of each pair of spacers rotated about said longitudinal axis 60° with respect to each other. To install spacer devices 10 and 10' they are first placed around central fuel rod 23, when they are held in place by the spring forces of strip 11 against control fuel rod 23, and then the rod and spacers are inserted into empty fuel element liner 21 with loops 12 and 12' occupying the space of channel 25 in curved portion 24 of fuel element liner 21. At the appropriate distance along fuel element liner 21, the spacers are rotated about the longitudinal axis of fuel element liner 21 by rotating central fuel rod 23 so that loops 12 and 12' of spacers 10 and 10' are engaged by the fuel spacer retaining means incorporated in the fuel element liner 21 hereinafter described. After the spacers are in position, fuel rods 22 are then inserted in the aforesaid hexagonal pattern to lock the assembly in place.

Figure 3:
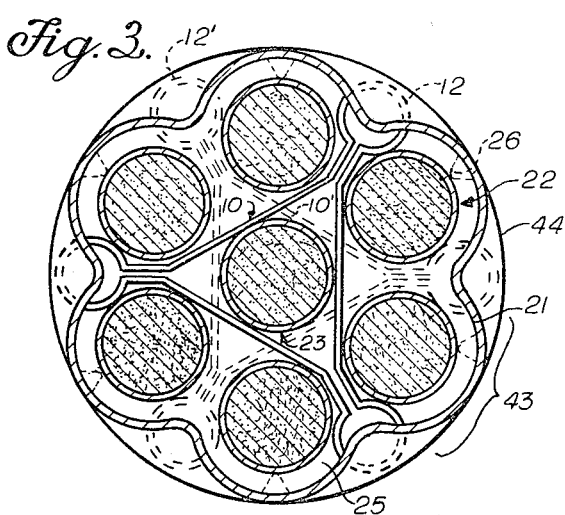
FIGURE 3 is a transverse section through a typical seven rod fuel element showing arrangement of the spacer device fitted into the recessed type of spacer retaining means.

Various embodiments of appropriate spacer retaining means are illustrated in FIGURES 2 through 7. Referring to FIGURES 2 and 4, a first embodiment of such means comprises inward projection 30 (FIGURE 4) in fuel element liner 21 provided in the inwardly projecting, longitudinal rib portions 32 of the scalloped liner 21, above and below loops 12 and 12' at the tips of each spacer 10 and 10' respectively. Such projections may be either dimples or perforated tabs in the liner itself or a welded, brazed or the like fastened boss. A second embodiment similar in all respects to the first embodiment is illustrated in FIGURE 5 with the exception that the projection 31 for retaining spacers 10 and 10' are elongated to insure the proper placement of said spacers. It will be noted in FIGURES 4 and 5 that portions of the spacer devices 10 and 10' are cut away to more clearly show their relationship to the spacer retainer means. A third embodiment is illustrated by FIGURES 3, 6 and 7 wherein the spacer retaining means comprises inward projection 41 forming the end of curved portions 43 which are of a similar configuration and perform the same function as curved portion 23 of FIGURE 2 distinguished, however, by undeformed portion 44 having the original shape and diameter of the unworked liner tube. Referring to FIGURE 3, pairs of spacer devices 10 and 10' are arranged in the fuel element assembly with the triangle side members encompassing central fuel rod 23 such that the geometric center of the triangular shaped spacers is coincident with the longitudinal axis of said central fuel rod 23 with the members of each pair of spacers rotated about said longitudinal axis 60° with respect to each other. Referring to FIGURE 6, a portion of spacer devices 10 and 10' have been cut away to more clearly show hidden parts of the devices and how they are retained by inward projection 41 deformed from the cylindrical tube liner 21 to form curved portion 43. The original diameter of cylindrical liner 21 is illustrated in FIGURE 7, by undeformed portion 44. It is into this undeformed portion 44 which loops 12 and 12' fit and are retained. Referring to FIGURE 6, it can be seen that spacer 10 will bear against deformed portion 41 at the upper side of undeformed portion 44 and that spacer 10' will bear against deformed portion 41' at the lower side of undeformed portion 44. The installation of spacer devices 10 and 10' in the embodiment illustrated in FIGURES 3, 6 and 7 is similar to the embodiment illustrated in FIGURES 2, 4 and 5. spacers 10 and 10' are first placed around central element rod 23 where they are held in place by the spring forces of strip 11 against central fuel rod 23 and then the rod and spacers are inserted into empty fuel element liner 21 with loops 12 and 12' occupying the space of channel 25, formed, in this embodiment, by curved portion 43 in fuel element liner 21. As previously described fuel element liner 21 was originally a cylinder being that of undeformed or cylindrical portion 44. Curved portions 43 can be formed by any appropriate method of rolling, stamping, hydroforming or the like. At the appropriate distance along fuel element liner 21 corresponding to undeformed portion 44, the spacers are rotated about the longitudinal axis of fuel element liner 21 by rotating central fuel rod 23 so that loops 12 and 12' of spacers 10 and 10' respectively are engaged between deformed portion 41 and 41'.

In all of the above embodiments, the distances between the upper and lower parts of the respective retaining means may be adjusted to give either a relatively tight or loose fit. A loose fit will have the advantage of allowing for thermal expansion and contraction of all parts of the fuel element assembly with abrasive slipping between the parts limited to places of low friction. Thus wear will be reduced to a minimum.

In an exemplary typical fuel element the fuel rods may be of about 0.450 inch O.D., the scalloped liner portions of about 0.59 inch circular diameter curvature, and the fuel rods disposed on about 0.52 inch centers with the O.D. of the liner being about 1 and 5/8 inches. The spacers may be made of sheet metal of about 0.010 in. thickness and about 1/3 inch width. Pairs of the spacers may be disposed with an average spacing of 7 inches with spacings being of the order of 6 inches in the central portions. With such spacings the axial hydraulic pressure drop is equal to or less than the pressure drop when using two helically wound 1/16 inch wire spacers having a six inch pitch. In addition, a much lower quantity of neutron absorbing metal is contained in the fuel element when using the triangular spacers of this invention.

Although the foregoing embodiment has been described in detail there are obviously many other embodiments and variations in configuration which can be made by a person skilled in the art without departing from the spirit, scope or principle of the invention. Therefore, this invention is not to be limited except in accordance with the scope of the appended claims.

What is claimed is:

1. In a fuel element assembly for a nuclear reactor, the combination comprising a generally cylindrical liner having retainer means provided at about 60° radial spacing in the inner peripheral walls thereof, and pairs of spacer devices formed as open triangles of deflectable semi-rigid sheet material having nodular loops at each corner of said triangle and a geometric axis perpendicular to the plane of said triangle, with adjacent members of said pairs of open triangles rotated 60° with respect to each other about the longitudinal axis of said fuel element, and disposed within said liner with said loops engaging said retaining means, whereby elongated fuel rods disposed in the spaces defined by triangular and cylindrical walls are retained in spaced relation therein.

2. An assembly as defined in claim 1 wherein said spacer devices comprise a strip of sheet metal bent to form an open triangle having nodular loops at each corner thereof.

3. An assembly as defined in claim 1 wherein said liner includes rounded indentations deformed radially inward in said liner and circumferentially spaced every 60° and longitudinally spaced along said liner to engage the loop portions and retain a pair of said spacers.

4. An assembly defined in claim 1 wherein said liner includes retaining means comprising elongated indentations deformed radially inward in said liner and aligned parallel with the longitudinal axis of said fuel element and circumferentially spaced every 60° and longitudinally spaced along said liner to engage and retain a pair of said spacers.

References Cited by the Examiner

UNITED STATES PATENTS

| 3,111,475 | 11/1963 | Davidson | 176—81 X |
|---|---|---|---|
| 3,137,638 | 6/1964 | Kumpf et al. | 176—78 |

FOREIGN PATENTS

| 1,082,679 | 6/1960 | Germany. |
| 975,297 | 11/1964 | Great Britain. |

References Cited by the Applicant

UNITED STATES PATENTS 3,068,163  12/1962  Currier.

BENJAMIN R. PADGETT, *Acting Primary Examiner.*

M. J. SCOLNICK, *Assistant Examiner.*